(12) United States Patent
Spinelli et al.

(10) Patent No.: US 11,411,530 B2
(45) Date of Patent: Aug. 9, 2022

(54) PHOTOVOLTAIC ELEMENT AND MOUNTED SURFACE COMPRISING SUCH PHOTOVOLTAIC ELEMENTS

(71) Applicant: GREENTI SAGL, Lugano (CH)

(72) Inventors: Federico Spinelli, Como (IT); Dario Manodoro, Como (IT); Daniel Lepori, Castagnola (CH)

(73) Assignee: GREENTI SAGL, Lugano (CH)

( * ) Notice: Subject to any disclaimer, the term of this patent is extended or adjusted under 35 U.S.C. 154(b) by 0 days.

(21) Appl. No.: 16/341,008

(22) PCT Filed: Oct. 10, 2017

(86) PCT No.: PCT/EP2017/075832
§ 371 (c)(1),
(2) Date: Apr. 10, 2019

(87) PCT Pub. No.: WO2018/069333
PCT Pub. Date: Apr. 19, 2018

(65) Prior Publication Data
US 2020/0186079 A1    Jun. 11, 2020

(30) Foreign Application Priority Data

Oct. 11, 2016  (CH) .................................. 01357/16

(51) Int. Cl.
*H02S 30/10* (2014.01)
*H02S 20/23* (2014.01)
(Continued)

(52) U.S. Cl.
CPC .............. *H02S 30/10* (2014.12); *F24S 25/40* (2018.05); *H02S 20/23* (2014.12); *F24S 2025/601* (2018.05); *Y02E 10/47* (2013.01)

(58) Field of Classification Search
CPC .............. H01L 31/042; H01L 31/0482; H01L 31/0484; H01L 31/0424; H01L 31/0422;
(Continued)

(56) References Cited

U.S. PATENT DOCUMENTS 5,895,536 A * 4/1999 Starr .......................... E04D 1/34
156/71
6,201,179 B1 3/2001 Dalacu
(Continued)

FOREIGN PATENT DOCUMENTS

DE  10 2009 019829 A1    11/2010
DE     102011003026 A1 *  7/2012 .............. F24S 25/33
(Continued)

OTHER PUBLICATIONS

Machine translation of DE102011003026A1 (Year: 2011).*
(Continued)

*Primary Examiner* — Eric R Smith
(74) *Attorney, Agent, or Firm* — Procopio, Cory, Hargreaves & Savitch LLP

(57) ABSTRACT

A photovoltaic element is provided that comprises a photovoltaic converter panel and at least one mounting arrangement. The photovoltaic converter panel defines a front surface adapted to receive solar impinging light and defines a back surface opposing the front surface. The at least one mounting arrangement is mounted to the back surface of the photovoltaic converter panel by a glue. Furthermore, a mounted surface is provided that comprises at least two such photovoltaic elements.

22 Claims, 11 Drawing Sheets

Figure 1:
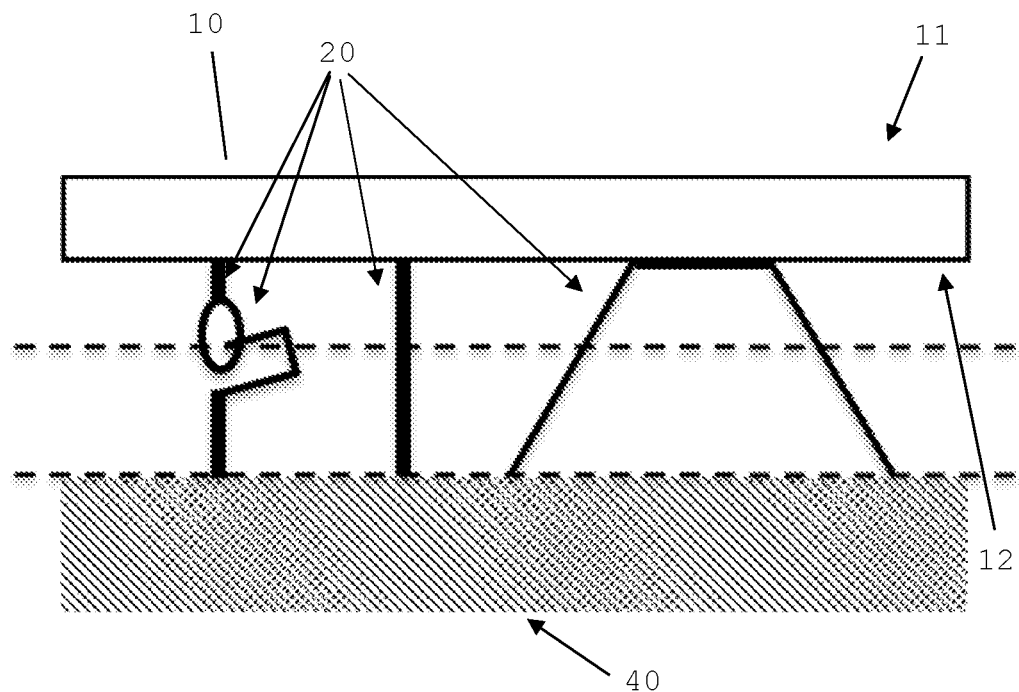

(51) Int. Cl.
*F24S 25/40* (2018.01)
*F24S 25/60* (2018.01)

(58) Field of Classification Search
CPC ..... H01L 31/0483; Y02E 10/50; F24J 2/0455; F24J 2/5201; F24J 2/52; F24J 2/5203; F24J 2/5205; F24J 2/5207; F24J 2/5211; F24J 2/5209; F24J 2/5233; F24J 2/5252; F24J 2/5262; F24J 2/526; F24J 2002/5288; F24J 2002/5203; F24J 2002/5215; F24J 2002/5218; F24J 2002/5222; F24J 2002/5224; F24J 2002/5226; H02S 30/10; F24S 2025/601; F24S 2025/021; F24S 2025/022; B32B 7/14; B32B 2457/12; E04D 2001/347; E04D 2001/3473; E04D 2001/3476; E04D 2001/3482; E04D 2001/3435; B23B 37/1292
USPC ................. 136/243–256; 52/173.3
See application file for complete search history.

(56) References Cited

U.S. PATENT DOCUMENTS

| | | | |
|---|---|---|---|
| 2008/0245399 A1* | 10/2008 | DeLiddo | F24S 25/16 136/244 |
| 2009/0266400 A1* | 10/2009 | DeLiddo | H02S 20/23 136/244 |
| 2010/0059104 A1* | 3/2010 | Geary | F24S 25/61 136/251 |
| 2010/0258158 A1* | 10/2010 | Kuster | F24S 25/12 136/244 |
| 2011/0265861 A1* | 11/2011 | Nabauer | F24S 25/12 136/251 |
| 2012/0151856 A1* | 6/2012 | Azoulay | H02S 40/36 52/173.3 |
| 2012/0240972 A1* | 9/2012 | Hitomi | H02S 20/22 136/244 |
| 2015/0129016 A1* | 5/2015 | Richardson | H02S 20/23 136/251 |
| 2016/0254778 A1* | 9/2016 | Chou | H02S 20/24 136/251 |

FOREIGN PATENT DOCUMENTS

| | | | |
|---|---|---|---|
| EP | 2395559 A1 | 12/2011 | |
| EP | 2479514 A2 | 7/2012 | |
| FR | 2957101 A1 | 9/2011 | |
| JP | 2011109072 A * | 6/2011 | ............ F24S 25/30 |
| JP | 2013222722 A * | 10/2013 | |
| WO | 2011/141293 A1 | 11/2011 | |
| WO | 2014/047633 A1 | 3/2014 | |

OTHER PUBLICATIONS

Machine translation of JP2011/109072A (Year: 2011).*
International Search Report and Written Opinion for related International Application No. PCT/EP2017/075832, dated Dec. 14, 2017; 15 pages.

* cited by examiner

PHOTOVOLTAIC ELEMENT AND MOUNTED SURFACE COMPRISING SUCH PHOTOVOLTAIC ELEMENTS

CROSS-REFERENCE TO RELATED APPLICATIONS

This application is a U.S. National Stage entry of PCT Application No: PCT/EP2017/075832 filed Oct. 10, 2017, which claims priority to Swiss Patent Application No. 01357/16, filed Oct. 11, 2016, the contents of which are incorporated herein by reference.

The present invention concerns a photovoltaic element with a solar energy photovoltaic converter panel providing for solar energy conversion and a mounting arrangement. Furthermore, the present invention addresses a mounted surface comprising such photovoltaic elements.

Photovoltaic converter panels are well known in the art and, due to the popularity of renewable energy and the tendency towards power self-supply, they gain more and more in importance. Thus, more photovoltaic converter panels are installed each year on houses, stables, factory buildings and in solar parks. Since the photovoltaic converter panels are valuable goods, it is important to guarantee for a secure installation that is still easy to handle.

The present invention has the object to provide a photovoltaic element allowing for an alternative manner of mounting a solar converter panel.

This is achieved by a photovoltaic element that comprises a photovoltaic converter panel and at least one mounting arrangement. The photovoltaic converter panel defines a front surface adapted to receive solar impinging light and defines a back surface opposing the front surface. The at least one mounting arrangement is mounted to the back surface of the photovoltaic converter panel by a glue.

The photovoltaic converter panel can thereby be mounted to a surface, e.g. a roof, by means of a mounting arrangement. The mounting on or to the surface can either be executed in a detachable manner or in a non-removable manner. The corresponding mounting arrangement can therefore be a controllably releasable mounting arrangement or a non-releasable mounting arrangement. Thus, the photovoltaic converter panel can be removed by specific and controlled action from the surface or is fixed permanently so that the surface itself has to be removed for removing the photovoltaic converter panel. In other words, the mounting arrangement interacts between the photovoltaic converter panel and the roof or any other surface the photovoltaic converter panel is mounted to.

The term "mounting by a glue" includes mounting by a hot melt material, mounting by an adhesive material and mounting by an adhesive structure.

In one embodiment of the photovoltaic element according to the invention, which may be combined with any of such embodiments of the present invention still to be addressed, unless in contradiction, the at least one mounting arrangement is designed as a plate, in particular as a plate in one piece, further in particular made of metal and/or plastic. In general, the term "mounting arrangement" represents both the controllably releasable mounting arrangement and the non-releasable mounting arrangement.

Such a plate may comprise several enhancements, which may be designed as a contact surface where the photovoltaic converter panel is glued to. The area of the plate might be larger than the area of the photovoltaic converter panel. Thus, photovoltaic converter panels can be mounted flush with at the same time overlapping mounting arrangements, the overlap acting as a theft protection.

In one embodiment of the photovoltaic element according to the invention, which may be combined with any of the preaddressed embodiments and embodiments still to be addressed, unless in contradiction, the at least one mounting arrangement comprises one part of a link designed to be engaged with a respectively tailored counterpart. The link can be either a releasable or non-releasable link.

In one embodiment of the photovoltaic element according to the invention, which may be combined with any of the preaddressed embodiments and embodiments still to be addressed, unless in contradiction, the at least one mounting arrangement is designed as at least two parts. One part thereof is mounted to the back surface of the photovoltaic converter panel by a glue and the other or another part thereof is attachable to a surface, in particular to a thermal insulating element, a mechanical stability element and/or an acoustical isolation element. The term "two parts" addresses both two controllably releasable parts and two non-releasable parts, i.e. two parts being non-releasable after mounting the photovoltaic converter panel to the surface.

The respective parts of the mounting arrangements can thereby be glued directly or indirectly to the photovoltaic converter panel and possibly also to the surface.

In one embodiment of the photovoltaic element according to the invention, which may be combined with any of the preaddressed embodiments and embodiments still to be addressed, unless in contradiction, the at least one mounting arrangement comprises a connecting element, which can either be glued to the back surface of the photovoltaic element and couple to another part of the mounting arrangement being attachable to a surface or connects one part of the mounting arrangement being glued the to the back surface of the photovoltaic element with another part of the mounting arrangement being attachable to a surface.

Such a connecting element may comprise a head part that may either be glued to the back surface of the photovoltaic element or may attachable to the one part of the mounting arrangement being glued to the back surface of the photovoltaic element and a support structure being attachable to attachable to a surface. The head part may be a hollow profile or an at least partially filled profile. The cross-sectional shape of the head part may be essentially rectangular, square or polygonal. The support structure may be designed, e.g., as ribs protruding from the head part.

In one embodiment of the photovoltaic element according to the invention, which may be combined with any of the preaddressed embodiments and embodiments still to be addressed, unless in contradiction, the at least one mounting arrangement comprises at least one pair of mechanical linking members that are mutually hingeable or interlockable and provide for controllably releasing the one part and the other part of the mounting arrangement.

The mounting arrangements can comprise mechanical linking members, one part thereof arranged by means of one part of a two-part mounting arrangement at the photovoltaic converter panel, another part thereof arranged by means of the other part of the two-part mounting arrangement at a surface. The addressed one and other part are mutually hingeable or interlockable. As perfectly clear to the skilled artisan, such mechanical linking members may, e.g., be realized by hooks at one part with respective openings at the other part, by groove and tongue links etc. The one and the other part of the mechanical linking member one can also call a pair of mechanical linking member.

In one embodiment of the photovoltaic element according to the invention, which may be combined with any of the preaddressed embodiments and embodiments still to be addressed, unless in contradiction, the pair of mechanical linking members defines a unique direction of a controllable release. The unique direction is in particular parallel to the photovoltaic converter panel.

In one embodiment of the photovoltaic element according to the invention, which may be combined with any of the preaddressed embodiments and embodiments still to be addressed, unless in contradiction, the at least one mounting arrangement comprises at least one pair of mechanical linking members that are mutually hingeable or interlockable and prevent releasing the one part and the other part of the mounting arrangement.

The mounting arrangements can comprise mechanical linking members, one part thereof arranged by means of one part of a two-part mounting arrangement at the photovoltaic converter panel, another part thereof arranged by means of the other part of the two-part mounting arrangement at a surface. The addressed one and other part are mutually hingeable or interlockable. As perfectly clear to the skilled artisan, such mechanical linking members may, e.g., be realized by hooks at one part with respective openings at the other part, by groove and tongue links etc. The one and the other part of the mechanical linking member one can also call a pair of mechanical linking member. To prevent a release the hooks and openings can, e.g., be designed comparable to safety seals where the hook can only be moved in one direction within the opening and the movement in the opposite direction is blocked.

In one embodiment of the photovoltaic element according to the invention, which may be combined with any of the preaddressed embodiments and embodiments still to be addressed, unless in contradiction, the pair of mechanical linking members is realized by hooks at one part and by respective openings at the other part of the mounting arrangement.

In one embodiment of the photovoltaic element according to the invention, which may be combined with any of the preaddressed embodiments and embodiments still to be addressed, unless in contradiction, the at least one mounting arrangement is at least in part a distance holder which provides at least one venting gap at the back surface of the photovoltaic converter panel.

The venting gap provided between the photovoltaic converter panel and the surface can be bridged by an arrangement of distance holders. These distance holders are at least in part the addressed mounting arrangements. Thus, the link between the photovoltaic converter panel and the surface may be established mechanically by means of one or more than one distance holders. The distance holder may be realized in two parts.

In one embodiment of the photovoltaic element according to the invention, which may be combined with any of the preaddressed embodiments and embodiments still to be addressed, unless in contradiction, the mounting arrangement is glued to the back surface of the photovoltaic element (10) via a multitude of gluing spots, wherein the area of an individual gluing spot is 2.0 cm² and ≤1500 cm², in particular ≥20 cm² and ≤600 cm². However, it would also be possible to attach the mounting arrangement via a single gluing spot of an appropriate size.

The gluing spots can be arranged in a certain symmetric or asymmetric pattern. The distance between neighboring gluing spots can be equidistant or variable. The gluing spots can be arranged along two or more equidistant and/or parallel rows. One row comprises one or more gluing spots, e.g. 1 up to 20 gluing spots, in particular 3 to 7, preferably 5. One or several up to all gluing spots of one row may be aligned with gluing spots of a neighboring row. By choosing the right pattern of gluing spots, it is even possible to provide for a step-proof photovoltaic element, meaning that a handyman/installer/maintenance worker can walk on the photovoltaic element without causing any damage, such as microcracks. A step-proof photovoltaic element with a photovoltaic converter panel of standard size (e.g. approximately 1 m times 1.7 m) comprises, e.g., three or more rows of gluing spots, preferably three or more parallel rows of gluing spots. Each row may comprise at least 2 gluing spots, in particular 2 to 10 gluing spots, preferably 5 gluing spots. A step-proof property can, for instance, be achieved, when the following equations are fulfilled:

$$i_x[m] \leq 70[N] * d[mm]/m[N]$$

$$i_y[m] \leq 70[N] * d[mm]/m[N]$$

with $i_x$: distance between adjacent gluing spots along the x-axis of the photovoltaic converter panel, i.e., the longer side of the essentially rectangular photovoltaic converter panel in [m];
$i_y$: distance between adjacent gluing spots along the y-axis of the photovoltaic converter panel, i.e., the shorter side of the essentially rectangular photovoltaic converter panel in [m];
d: thickness of the photovoltaic converter panel in [mm];
m: weight of the handyman/installer/maintenance worker in [N].

For instance, if the photovoltaic converter panel has a thickness of 10 mm (typical thicknesses are, e.g. ≥5 mm and ≤30 mm, in particular ≥5 mm and ≤15 mm) and a person walking on the photovoltaic element has 102 kg and thus 1000 N, the maximum distance of the adjacent gluing spots is 0.7 m. Typical distances between adjacent gluing spots along the x-axis and/or y-axis are, e.g., ≥0.10 m and ≤0.85 m. The area of a gluing spot is, e.g., ≥2.0 cm² and ≤1500 cm² and a typical thickness of a gluing spot is ≥0.10 mm and ≤50 mm. The distance between gluing spots may be kept below 0.85 m to account for other loads than a single person, too.

The at least one mounting arrangement of a photovoltaic element according to the invention can be designed in the following manners:
either in one piece:
the one piece is detachable from the surface the photovoltaic element is mounted to by means of said one-piece mounting arrangement; or
the one-piece is non-releasable from the surface the photovoltaic element is mounted to by means of said one-piece mounting arrangement;
or in at least two parts:
either detachable:
one part of the two-part/multi-part mounting arrangement is detachable from the surface the photovoltaic element is mounted to by means of said two-part/multi-part mounting arrangement; or
one part of the two-part/multi-part mounting arrangement is detachable from a counterpart, both/all being part of the said two-part/multi-part mounting arrangement; or
a combination of the two aforementioned options;
or non-releasable:
none of the parts of the two-part/multi-part mounting arrangement is detachable from the surface the photovoltaic element is mounted to by means of said two-part/multi-part mounting arrangement; or none of the parts of the two-part/multi-part mounting arrangement is detachable from a counterpart, both/all being part of the said two-part/multi-part mounting arrangement; or a combination of the two aforementioned options;

or the at least one mounting arrangement can be designed as a combination of any of the aforementioned options for "detachable" and "non-releasable".

Thus, a photovoltaic element according to the invention that is mounted to a surface by means of a mounting arrangement can be separated from the surface, in case it is attached in a detachable manner, by releasing the mounting arrangement from the surface and/or by releasing one part of a releasable link from a respectively tailored counterpart of the mounting arrangement.

In case the photovoltaic element according to the invention comprises more than one mounting arrangement, the mounting arrangements can be designed in the same manner or in a different manner.

The at least one mounting arrangement of a photovoltaic element according to the invention can comprise one of the following materials or a combination thereof:
- metal, such as aluminum, copper, steel, in particular stainless steel or galvanized steel, or metal alloys;
- ceramic;
- plastic, in particular fiber reinforced plastic;
- cement, in particular fiber cement.

The present invention further addresses a mounted surface which comprises at least two photovoltaic elements according to the invention as addressed above.

The present invention is further directed to a mounted surface with at least two photovoltaic elements, whereat the adjacent mounting arrangements are sealingly connected to provide for a single waterproof layer.

The sealing, in particular waterproof, connection can be performed, for instance, by mounting arrangements that are designed as a plate made in one piece, i.e. as a continuous plate without comprising any interruptions, openings or the like. Such a plate can either represent a mounting arrangement formed in one part or one part of a mounting arrangement formed in two parts, in particular the part that is not connected to a photovoltaic converter panel. It is preferable that, in case the mounting arrangements comprise pairs of mechanical linking members, only those parts of the two-part mounting arrangements comprise openings or recesses who are not designated to provide for a single waterproof layer.

The present invention is even further directed to a mounted surface with at least three photovoltaic elements that are arranged in line. Thereby, the center photovoltaic element is blocked by the adjacent photovoltaic elements.

Even further, the present invention is directed to a mounted surface with at least two photovoltaic elements having a pair of mechanical linking members defining a unique direction of a controllable release. Thus, one of the photovoltaic elements is blocked in the unique direction by the adjacent photovoltaic element.

In general, all mounted surfaces that consist or comprise photovoltaic elements according to the invention can provide for a single waterproof layer.

The invention shall now be further explained by examples and with the help of figures.

Figure 2:
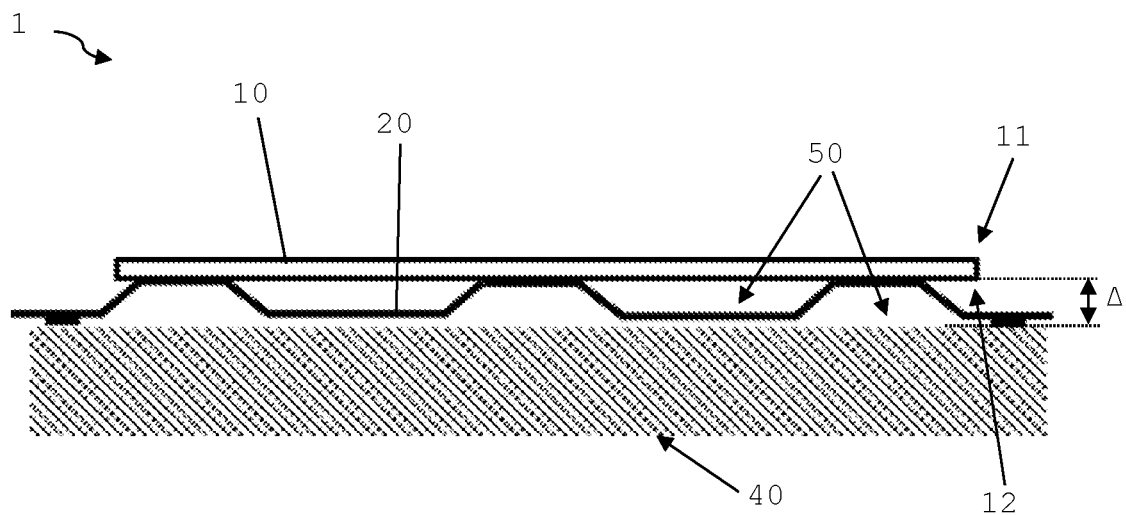
Figure 3:
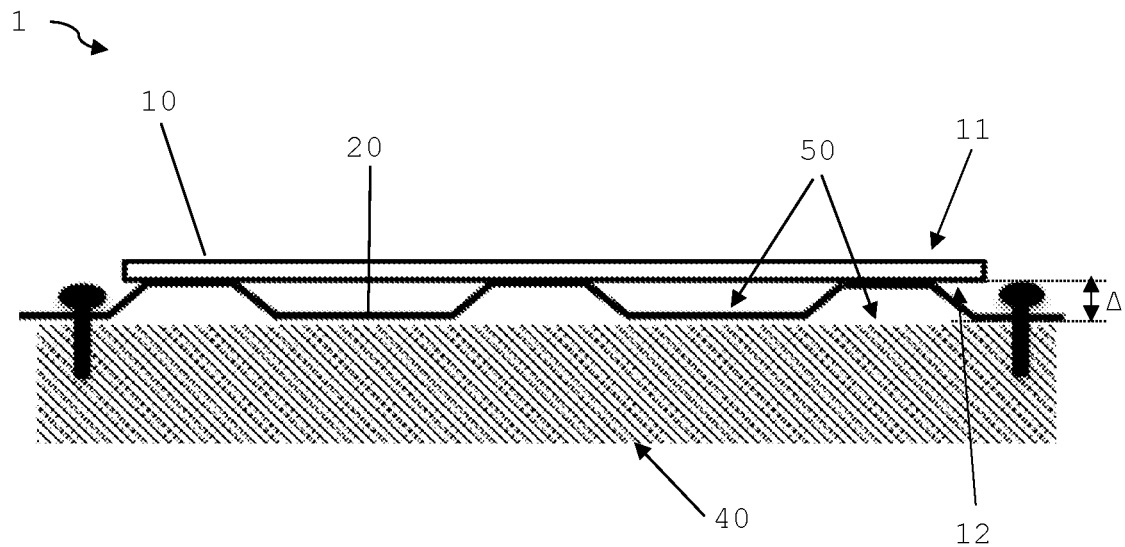
Figure 4:
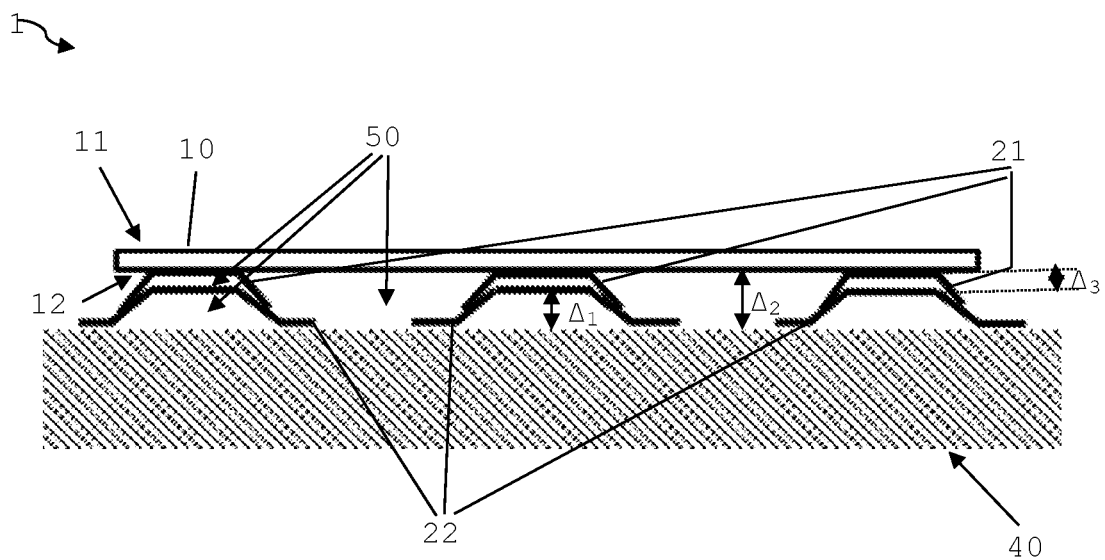
Figure 5:
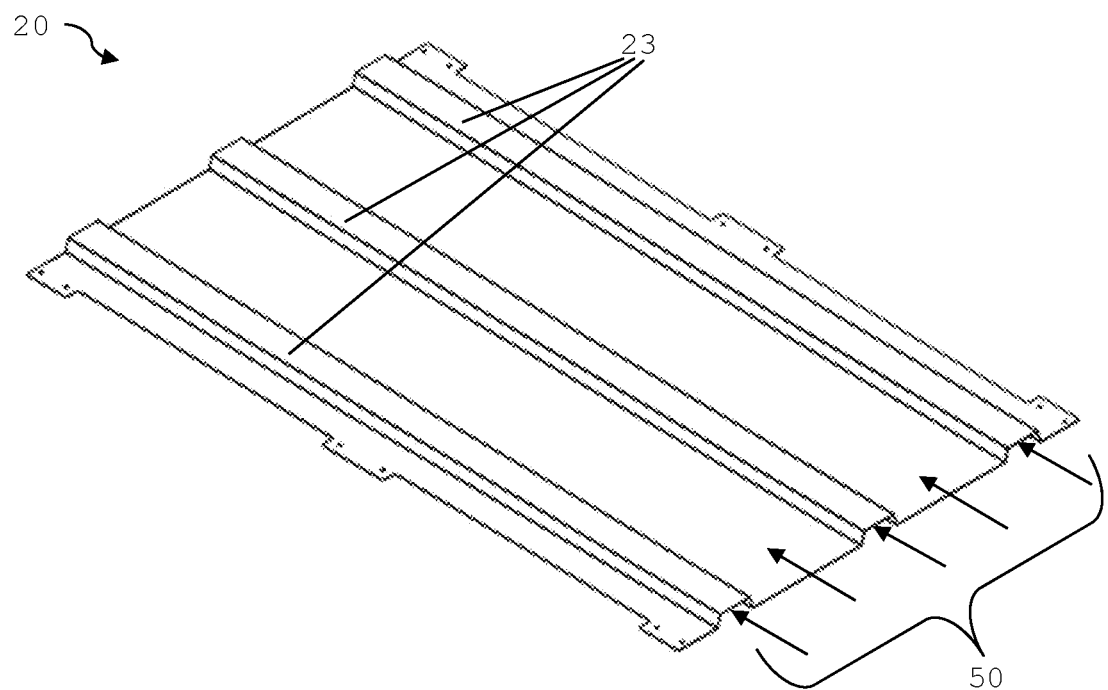
Figure 6:
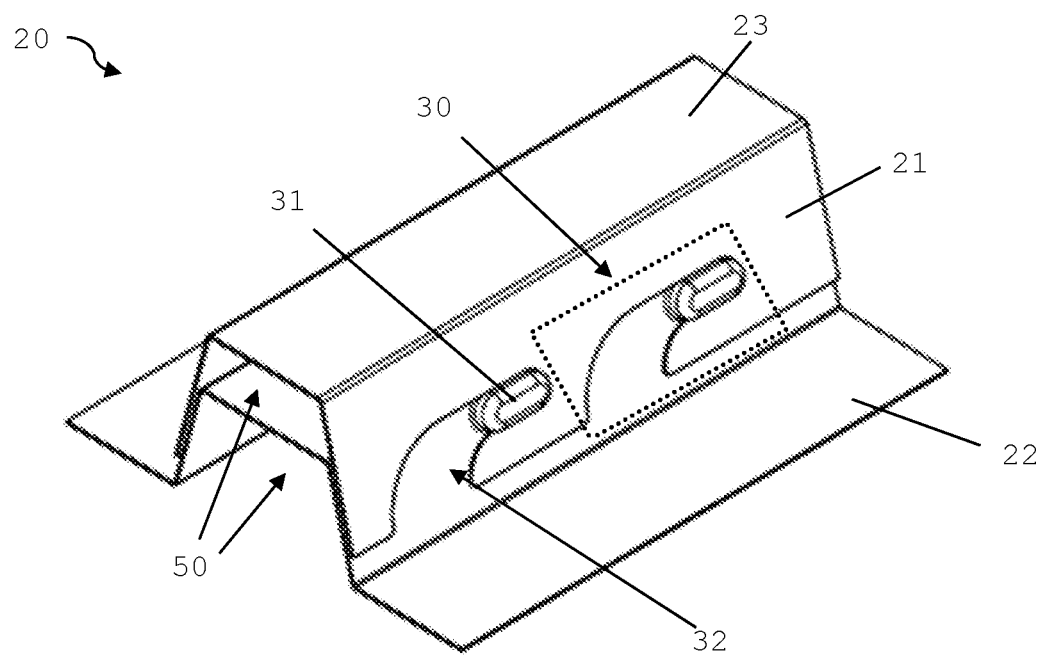
Figure 7:
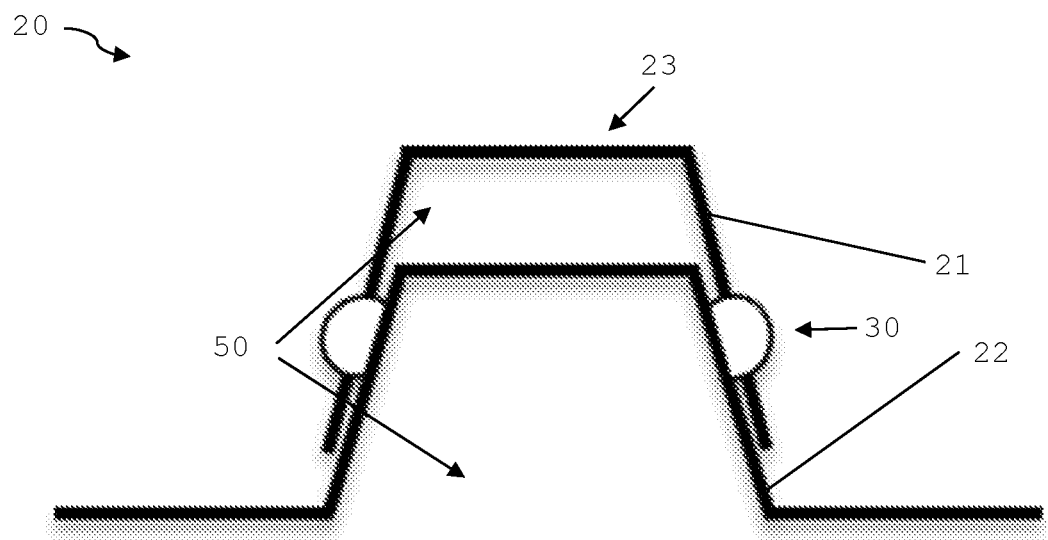
Figure 8:
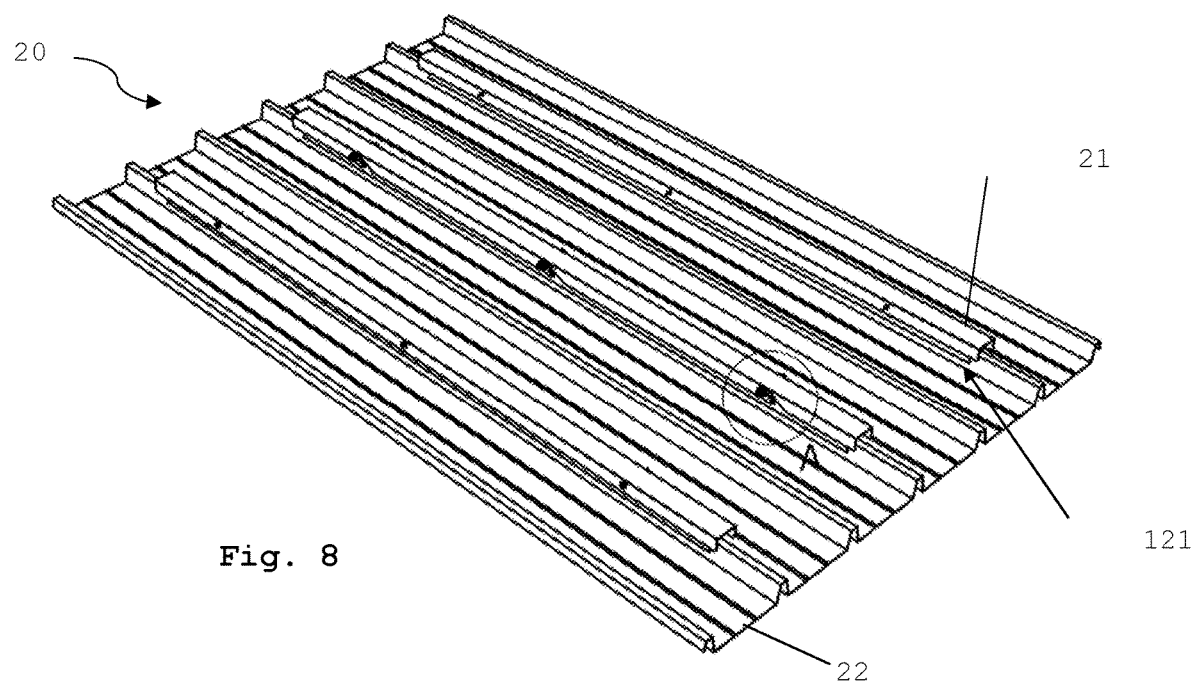
Figure 9A:
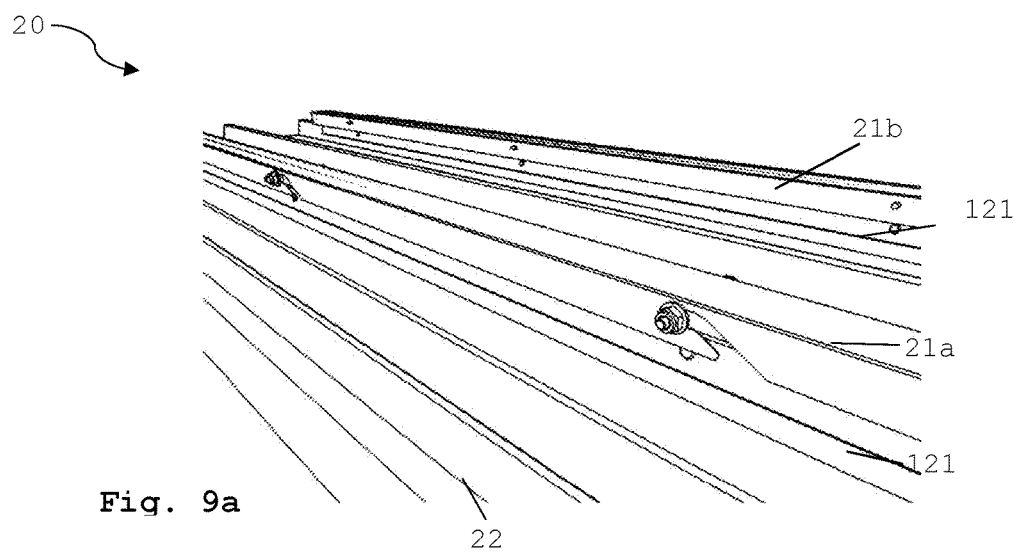
Figure 9B:
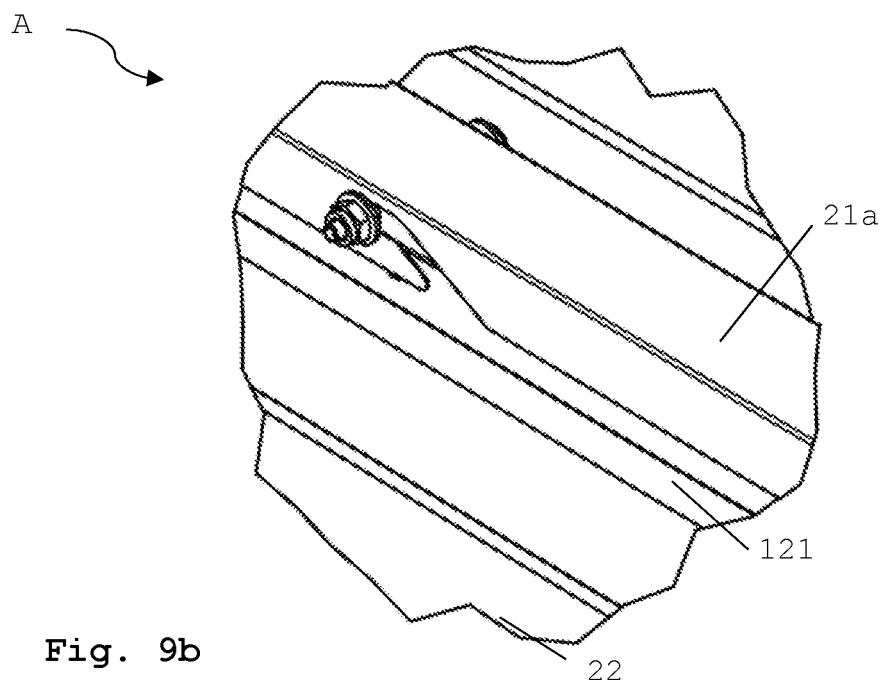
Figure 11:
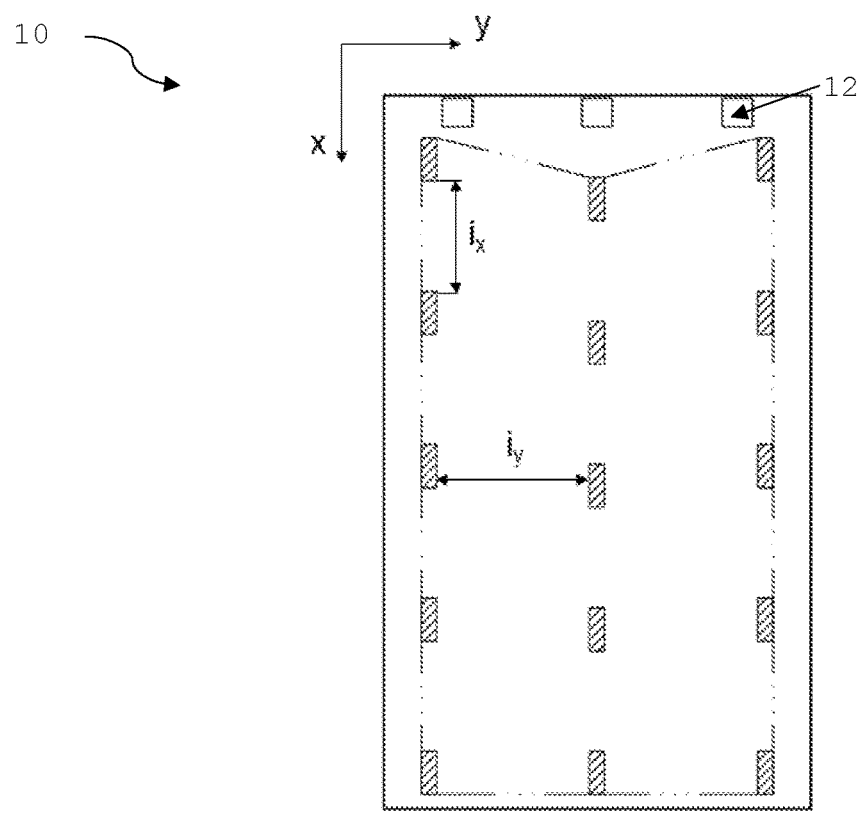
Figure 12A:
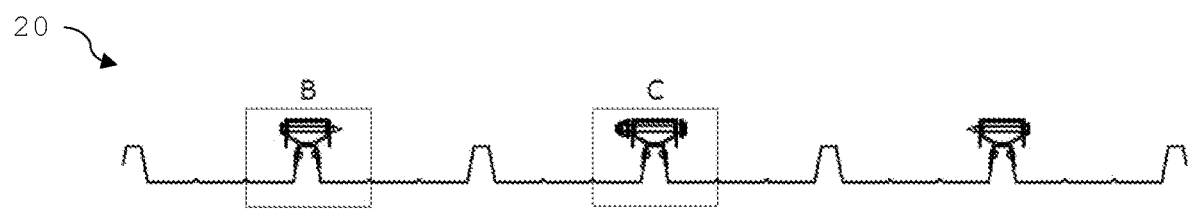
Figure 12B:
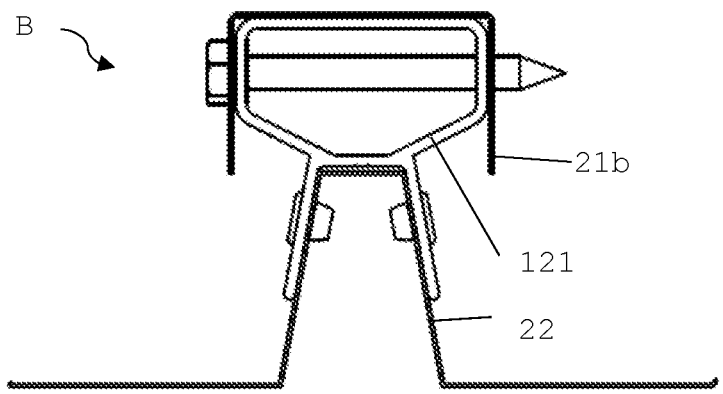
Figure 12C:
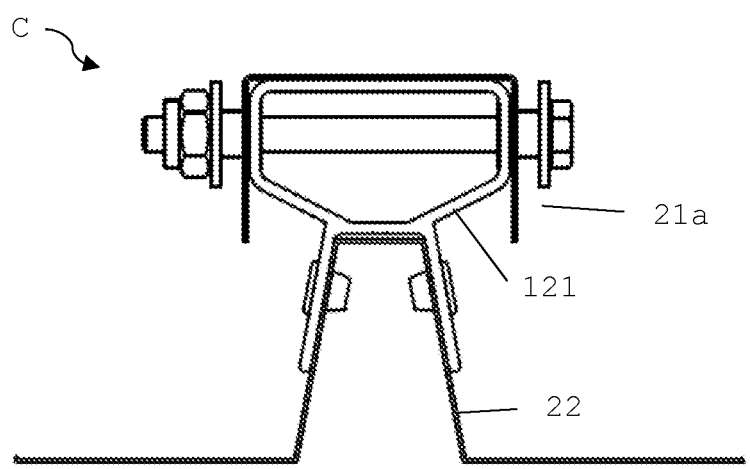
Figure 12D:
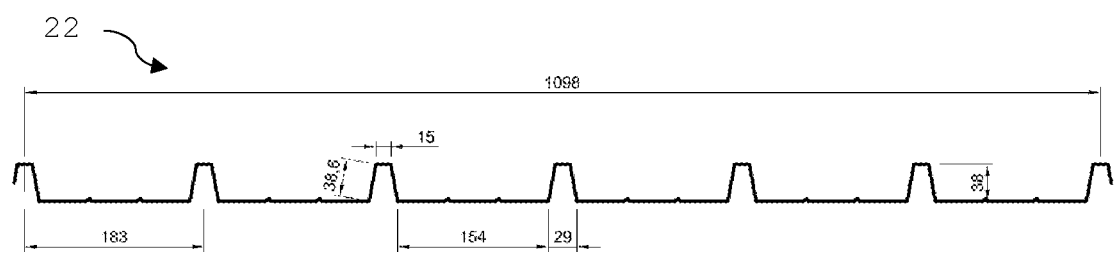
Figure 13A:
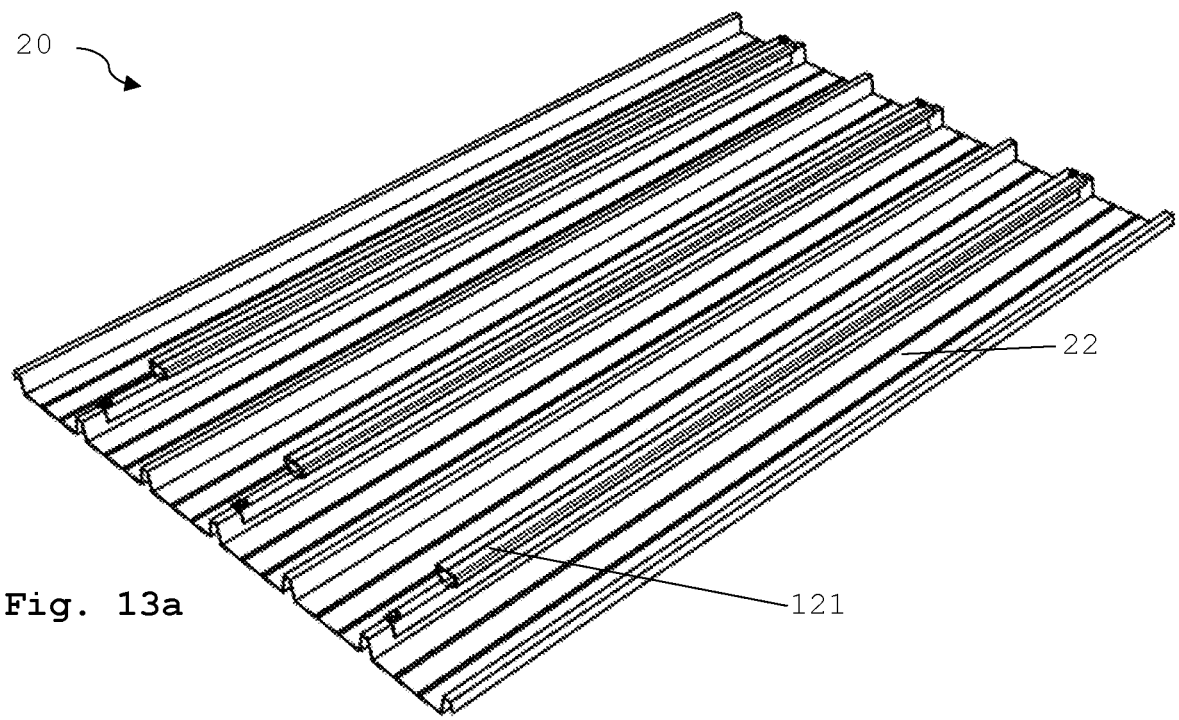
Figure 13B:
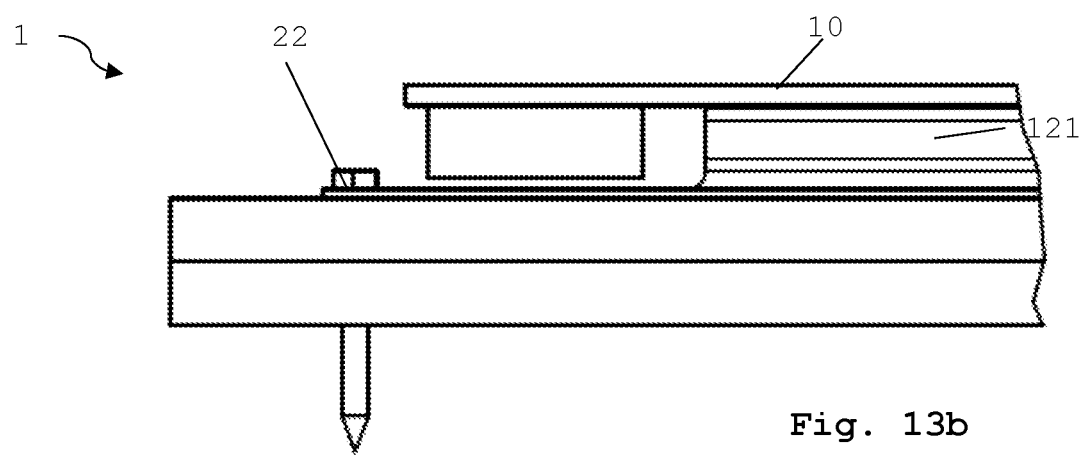
Figure 14:
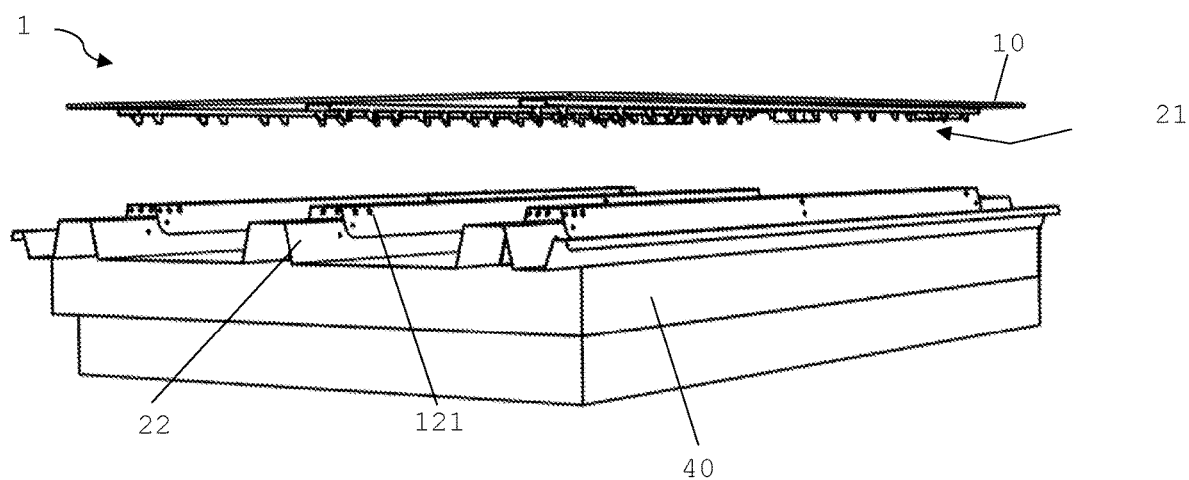

The figures show:

FIG. 1: most schematic and simplified the possible positions for detaching the photovoltaic converter panel and the surface for differently designed mounting arrangements;

FIG. 2: most schematic and simplified, an embodiment of a photovoltaic element comprising a photovoltaic converter panel and a mounting arrangement according to the present invention;

FIG. 3: most schematic and simplified, a further embodiment of a photovoltaic element comprising a photovoltaic converter panel and a mounting arrangement according to the present invention;

FIG. 4: most schematic and simplified, a further embodiment of a photovoltaic element according to the invention;

FIG. 5: a perspective view of an embodiment of a mounting arrangement of a photovoltaic element according to the invention;

FIG. 6: a perspective view of a further embodiment of a mounting arrangement of a photovoltaic element according to the invention;

FIG. 7: a schematic and simplified cross sectional view of an embodiment of a mounting arrangement of a photovoltaic element according to the invention;

FIG. 8: a perspective view of an embodiment of a mounting arrangement designed in three parts;

FIG. 9a: a close-up view of the embodiment shown in FIG. 8;

FIG. 9b: a close-up view of section A of the embodiment shown in FIG. 8;

FIG. 10a-e: individual depiction of the parts of the embodiment shown in FIG. 8;

FIG. 11: a view on a back surface of a photovoltaic converter panel;

FIG. 12a: a cross sectional view of the embodiment shown in FIG. 8;

FIG. 12b: a close-up view of section B of FIG. 12a;

FIG. 12c: a close-up view of section C of FIG. 12a;

FIG. 12d: a cross sectional view of a part (the other part, the part being attachable to a surface) of an embodiment of a mounting arrangement;

FIG. 13a: a perspective view of an embodiment of a mounting arrangement;

FIG. 13b: a cross section of an embodiment of a photovoltaic element;

FIG. 14: an embodiment of a photovoltaic element; and

Figure 15:
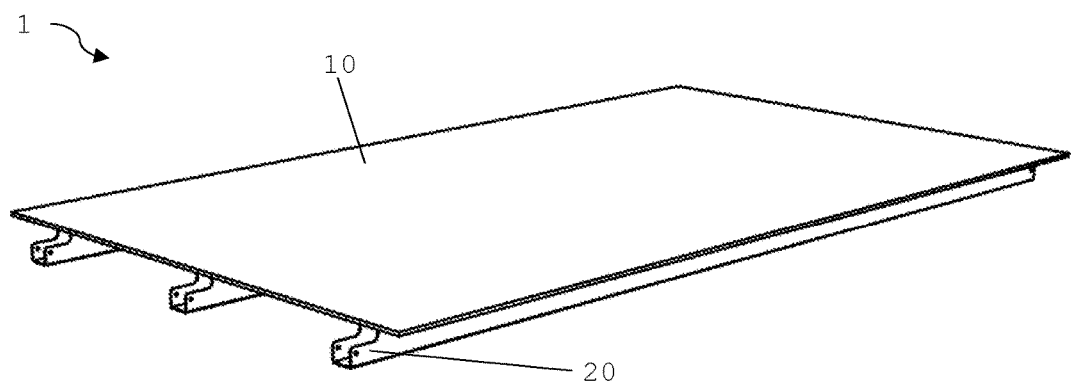

FIG. 15: a schematic perspective view of an embodiment of a photovoltaic element.

FIG. 1 shows three different kinds of mounting arrangements 20. From left to right: a mounting arrangement consisting of two parts, such as loop and hook, a one-piece mounting arrangement in the shape of a pole and a one-piece mounting arrangement designed as a U-profile. All mounting arrangements are non-releasably attached to the back surface 12 of the photovoltaic converter panel 10, e.g. by a glue. The dashed lines indicate where the release of the photovoltaic converter panel 10 from the surface 40 can occur in case the photovoltaic converter panel 10 is mounted in a detachable manner. As the mounting arrangement 20 or at least one part of the mounting arrangement is always fixed to the photovoltaic converter panel 10, the separation can take place either between the surface 40 and the mounting arrangements 20 (bottom dashed line) or between the two parts of a two-part or multi-part mounting arrangement 20 (upper dashed line).

FIG. 2 shows most schematically and simplified an embodiment of a photovoltaic element 1 according to the invention. The mounting arrangement 20 is designed in one part and extends substantially from one edge of the photovoltaic converter panel 10 to the thereto opposed edge. The mounting arrangement 20 is fixed to a surface 40, such as a roof of a house. The mounting arrangement 20 is, e.g., fixed by a glue to the surface 40, the photovoltaic converter panel 10 is non-removably mounted to the surface 40 by means of a non-releasable mounting arrangement 20. The profile of the mounting arrangement, in a cross-sectional view, is comparable to U-profiles that are connected to each other. The bottom of the Us is thereby mounted to the back surface 12 of the photovoltaic converter panel 10 by a glue. The U-shape provides for venting gaps 50 enclosed by the U-shapes and between the connected Us. The distance $\Delta$ between the surface 40 and the back surface 12 of the photovoltaic converter panel 10 may vary from one realization form to the other and may be vanishing. This is also the case for the distances $\Delta_1$, $\Delta_2$, and $\Delta_3$ that are addressed in FIG. 4. In case the distance $\Delta$ vanishes, there is no gap provided between the back surface 12 of the photovoltaic converter panel 10 and the surface 40. Is a venting-air-gap established, the distance $\Delta$ does not vanish.

In FIG. 3 an embodiment of the invention comparable to FIG. 2 is shown. But in this embodiment the mounting arrangement 20 is, e.g., fixed by a screw and the photovoltaic converter panel 10 is detachably mounted to the surface 40 by means of a controllably releasable mounting arrangement 20. This means that the photovoltaic converter panel 10 may be removed from the surface 40 and may be reapplied. Thereby, the controllably releasable mounting arrangement 20 most generically enables the proper and accurate positioning of the photovoltaic converter panel 10 at the surface 40, and, once applied, makes sure that the photovoltaic converter panel may be locked in its position so as to prevent unallowed, i.e. unauthorized, removal.

FIG. 4 shows most schematically and simplified a further embodiment of a photovoltaic element 1 according to the invention. In this embodiment, the mounting arrangement 20 consists of two parts. One part 21 is mounted to the back surface 12 of the photovoltaic converter panel 10 by a glue and the other part 22 is fixed to a surface 40, e.g. by a glue, screwed, laminated, clipped, stacked, welded and so on. In total, there are three mounting arrangements 20 that are not connected to each other, i.e. independent mounting arrangements. The parts 21 of the mounting arrangements 20 on the backside of the photovoltaic converter panel 10 can be strips 21 glued thereto. The surface 40 can have respective U-profile strips 22. The strips 22, e.g., may be glued to the surface 40 or may be mounted by rivets, screws etc. or the surface 40 may in one piece be profiled with the addressed strips 22. The two parts 21,22 can be linked either releasable or non-releasable. To achieve a non-releasable link, the two parts 21,22 can be, e.g., glued, laminated, riveted or welded but also be linked by hooks and openings designed analogues to a safety seal. The mounting arrangements 20 provide for three different types of venting gaps 50. A first type of gap occurs between the independent mounting arrangements (having the distance $\Delta_2$), a second type occurs between the one part 21 and the other part 22 of the mounting arrangements 20 (having the distance $\Delta_3$) and a third type occurs underneath the part 22 of the mounting arrangements 20 that is fixed to a surface 40 (having the distance $\Delta_1$). The second type of venting gap is thereby caused by a special design of the mounting arrangement 20 that does not allow for a flat contact area of the two parts 21,22.

In FIG. 5 a perspective view of an embodiment of a mounting arrangement 20 of a photovoltaic element 1 according to the invention is shown. The photovoltaic converter panel is not shown in this figure. The mounting arrangement 20 is a plate which comprises several substantially U-shaped profiles that extend along its full length. The profiles run parallel to each other. The plate comprises recesses, such as bore holes, for fixing the mounting arrangement 20 to a surface. Such a plate can be made of metal, such as aluminum, steel, copper or metal alloys, and/or of plastic. The profiles provide for venting gaps 50. On the one hand, the venting gaps 50 form venting channels underneath the enhancement of the mounting arrangement 20 and on the other hand, the venting gaps 50 form venting channels between the single enhancements of the mounting arrangement 20. The exemplary mounting arrangement 20 shown is designed as one part. In the complete photovoltaic element according to the invention, the back surface of the photovoltaic converter panel is glued to the contact surface 23 of the mounting arrangement. Nevertheless, in case of a two-part mounting arrangement, one part or the two parts of the mounting arrangement can be a plate comparable to the one described recently.

FIG. 6 shows a perspective view of a further embodiment of a mounting arrangement 20 of a photovoltaic element 1 according to the invention. The photovoltaic converter panel is not shown in this figure. In the complete photovoltaic element according to the invention, the back surface of the photovoltaic converter panel is glued to the contact surface 23 of the mounting arrangement. The mounting arrangement 20 is designed as two parts 21,22 and comprises two pairs of mechanical linking members 30. One part 22 comprises a projecting hook or nose 31 and the other part 21 comprises a slit-shaped recess or opening 32 for engaging the hook or nose 31. The hook or nose 31 may be lengthwise slit into the recess or opening 32. Thus, the two parts 21,22 are linked by the mechanical linking members 30. The recess or opening 32 is formed such that the parts 21,22 can only be released by moving the part 21 that is connected to the photovoltaic converter panel in only one direction. For mounting the photovoltaic converter panel 10 the hook 31 is introduced in the respectively positioned opening 32. With respective shaping of the hook 31 the photovoltaic converter panel 10 may be fixed by then sliding the panel 10 with the opening 32 over the hook 31 in one direction and by a short movement, so that the hook 31 becomes hinged within the part 21 of the mounting arrangement glued to the photovoltaic converter panel 10. The opening and the hook can also be arranged vice versa, i.e. the mounting arrangement part designated to be attached to the photovoltaic converter panel comprises a hook and the mounting arrangement part designated to be attached to the surface comprises an opening. Once the photovoltaic converter panel 10 is firmly positioned on the surface 40, it may be locked thereto as by locking pins introduced through respective openings on one hand in and on the other hand through hooks. Venting gaps 50 are provided underneath the part 22 comprising the hook or nose 31 and between the two parts 21,22.

In case several photovoltaic elements having such a two-part mounting arrangement 20 are aligned in a row, the photovoltaic elements can only be released one after the other since a remounting is only possible in one direction. Therefore, it is enough to securely lock the photovoltaic elements mounted last to securely lock the whole line of photovoltaic elements.

FIG. 7 shows a schematically and simplified cross sectional view of an embodiment of a mounting arrangement 20 of a photovoltaic element 1 according to the invention. The photovoltaic converter panel is not shown in this figure. In the complete photovoltaic element according to the invention, the back surface of the photovoltaic converter panel is glued to the contact surface 23 of the mounting arrangement. The mounting arrangement 20 is a two-part mounting arrangement 21,22 that comprises two pairs of mechanical linking members 30, one pair at each side wall of the mounting arrangement 20. Venting gaps 50 are provided comparable to the ones described in FIG. 6. The part 21 of the mounting arrangement 20 that is designated to be mounted to the back surface of the photovoltaic converter panel is designed such that it cannot align the other part 22.

FIG. 8 shows a perspective view of an embodiment of a mounting arrangement 20 designed in three parts; one part 21 being mountable by a glue to a back surface of a photovoltaic converter panel (not shown), another part 22 being attachable to a surface (not shown) and a third part 121, namely the connecting element, connecting the one part 21 and the other part 22. The other part 22 being attachable to a surface, such as a thermal insulating element, a mechanical stability element or an acoustical isolation element, is in the shown embodiment a corrugated sheet having several U-shaped profiles. The U-shaped profiles of the shown embodiment can be parallel to each other and equidistant. A connecting element 121 can be attached to every second of said U-shaped profiles, e.g., by screws, bolts or rivets. The one part 21 designated to be glued to a photovoltaic converter panel (not shown) is positioned on the side of the connecting element 121 being opposite to the side facing the corrugated sheet 22. Said one part 21 can be designed as a U-shaped rail and can comprise various openings, either openings like boreholes that enable the fixation by a screw, bolt or rivet, or openings like a recess at an edge of the rail that enable the fixation by hooking. It is, e.g., advantageous to glue three of such one parts 21 to a photovoltaic converter panel, the one in the middle with recesses to be hooked and two left and right with boreholes to be screwed. By gluing more than one rail 21, e.g. three rails 21, to a photovoltaic converter panel and fixing the rails 21 via connecting elements 121 to a U-profiled corrugated sheet 22, it is possible to form a photovoltaic element strong enough to walk on. Furthermore, such a photovoltaic element can even handle a maximum load of 5400 Pa of snow and/or 2400 Pa of wind. Such a photovoltaic element also allows for removing the photovoltaic converter panel with simple activities.

FIG. 9a is a close-up of the embodiment of the mounting arrangement shown in FIG. 8. Well visible are the other part 22 (here in the form of a corrugated sheet) being attachable to a surface (not shown), the connecting elements 121 and two embodiments of the one part 21a, 21b designated to be glued to a photovoltaic converter panel (not shown). One of the embodiments of the one part 21b comprises boreholes in order to be screwed to a connecting element 121 comprising also boreholes. The other embodiment of the one part 21a comprises recesses such that it can be hooked to protruding members of a connecting element 121. These protruding members can be an integral part of the connecting element 121 or can be formed by an additional member such as a bolt, pin or screw.

FIG. 9b is a close-up of the section A of the embodiment of the mounting arrangement shown in FIG. 8. To be seen is in more detail how the other embodiment of the one part 21a, which comprises recesses, can be hooked to protruding members of the connecting element 121, in this case to a protruding screw inserted through the through holes of the connecting element 121.

FIG. 10a-d show perspective views of the single members belonging to the mounting arrangement of FIG. 8.

Figure 10A:
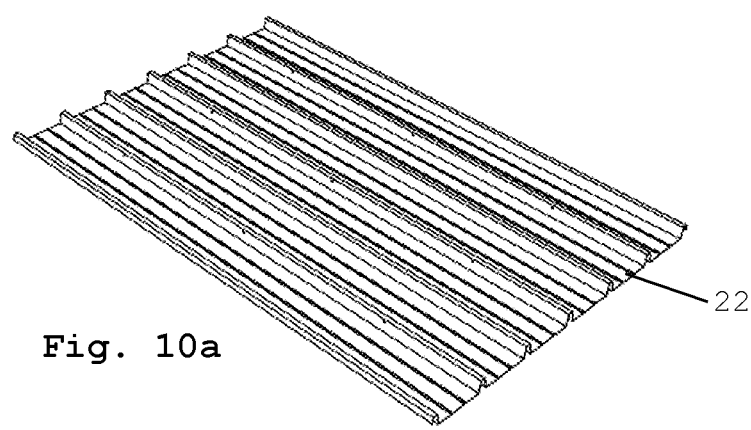

FIG. 10a shows an embodiment of another part 22 being attachable to a surface, the another part 22 being a corrugated sheet having several U-shaped profiles. For example, standard corrugated sheets manufactured by roll forming machines can be used. These standard corrugated sheets can be made of aluminum-zinc, Magnelis®, i.e., steel with a zinc-aluminum-magnesium coating, (painted) galvanized steel and so on.

For the assembling of a mounting arrangement comprising of the single components shown in FIG. 10a-d, the following activities may be performed:

Drilling holes for fastening means, such as rivets, into the other part, in this example into the corrugated sheet;

Drilling holes for fastening means, such as rivets, into the connecting elements, preferably both into the support structure and the hollow profile; and Coupling the other part, i.e. the corrugated sheet, and the connecting element, e.g. by means of rivets.

Figure 10B:
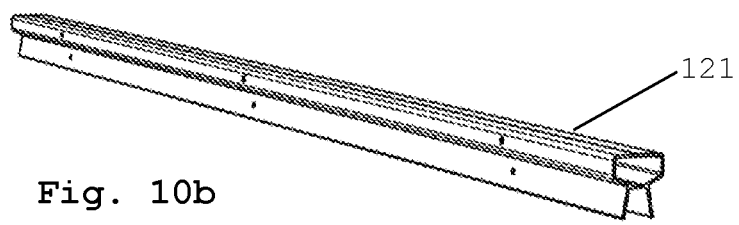

FIG. 10b shows a connecting element 121 comprising a hollow profile having a substantially rectangular cross section and a support structure having a shape being substantially complementary to the profile of the other part 22, in this embodiment being complementary to the U-profiles of the corrugated sheet 22 and thus having a U-shape itself. Thus, the connecting element 121 shown here has the form of a box-shaped hollow profile with two ribs protruding downward from a bottom plate of the box-shaped hollow profile and extending along the length of the box-shaped hollow profile. The hollow profile as well as the support structure can comprise a borehole or several boreholes in order to facilitate attaching the connecting element 121 to the other part 22 of the mounting arrangement and/or to facilitate attaching the one part 21 of the mounting arrangement to the connecting element 121. In general, connecting elements can be produced using extrusion processes and are preferably made of an aluminum alloy, e.g., an aluminum alloy of the 6000 series.

Figure 10C:
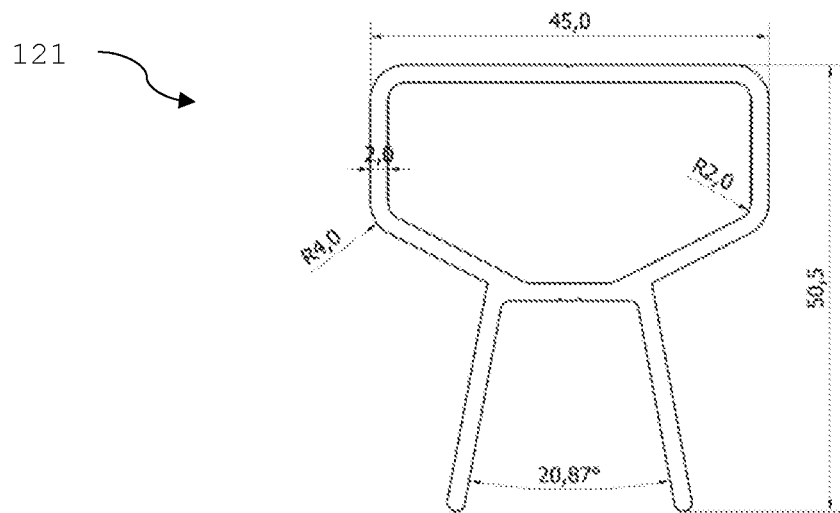

FIG. 10c is a cross section of the connecting element 121 of FIG. 10b showing a possible dimension of such a connecting element.

Figure 10D:
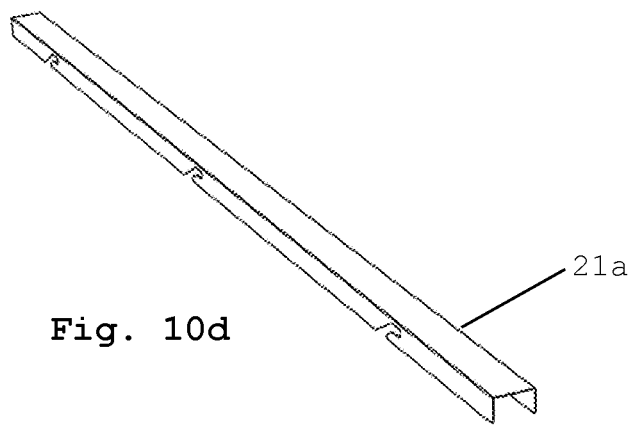

FIG. 10d shows an embodiment of a one part 21b of the mounting arrangement of FIG. 8, said one part 21b being designated to be glued to a photovoltaic converter panel, in particular to the middle area and not to the edge area of the back surface of the photovoltaic converter panel. The one part 21b is designed as a rail having at least one recess at the edge of the rails to enable hooking the rail 21b to a protrusion, such as a pin, a bolt or a screw.

Figure 10E:
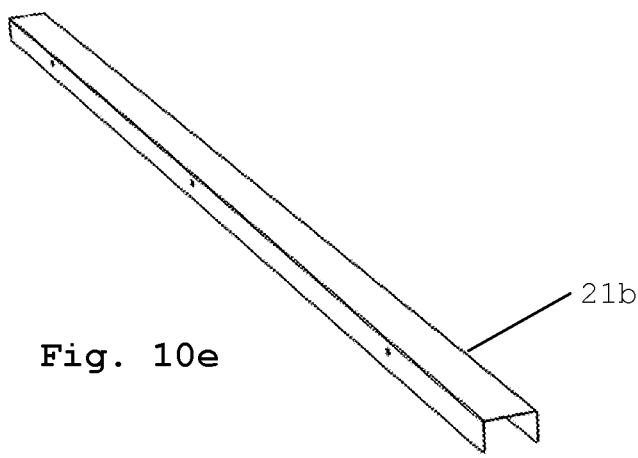

FIG. 10e shows another embodiment of a one part 21a of the mounting arrangement of FIG. 8 said one part 21a being designated to be glued to a photovoltaic converter panel, in particular to the edge area and not to the middle area of the back surface of the photovoltaic converter panel. The one part 21a is designed as a rail having at least one borehole to enable a secure or even permanent fixation by the use of bolts, screws, pins, rivets and so on. The one parts designated to be glued to a photovoltaic converter panel can generally be made of, e.g., stainless steel such as AISI 304 (also known as V2A), and can be fabricated using cutting, drilling and bending processes, independent of the embodiment of the one part.

To be seen in FIG. 11 is a simplified view on the back surface 12 of an essentially rectangular photovoltaic converter panel 10 extending in x- and y-direction. The hatched areas represent the gluing spots to be applied to connect the mounting arrangement (not shown) to the photovoltaic converter panel 10. In total there will be 15 gluing spots in 3 rows a 5 gluing spots. The area surrounded by the dashed line indicates the recommended step-proof area. In addition to the recommended step-proof area, the areas outside the recommended step-proof area may also be considered as step-proof, as long as no sudden, powerful and concentrated impact is applied. $i_x$ represents the distance between adjacent gluing spots along the x-axis of the photovoltaic converter panel, i.e., the longer side of the essentially rectangular photovoltaic converter panel in [m] and $i_y$ represents the distance between adjacent gluing spots along the y-axis of the photovoltaic converter panel, i.e., the shorter side of the essentially rectangular photovoltaic converter panel in [m]. Both distances are ≥0.10 m and ≤0.85 m and the area of an individual gluing spot is ≥2.0 cm$^2$ and ≤1500 cm$^2$.

FIG. 12a shows a cross section of a mounting arrangement 20 based on the one shown in FIG. 8. More detailed views of the sections B and C of the mounting arrangement 20 are shown in FIG. 12b and FIG. 12c.

FIG. 12b shows the section B of the corrugated sheet representing the other part 22 of the mounting arrangement. Said section comprises a U-shaped profile where a connecting element 121 is riveted to. The connecting element 121 comprises a hollow profile having a substantially rectangular cross section and a support structure, here shown in the form of U-profile formed complementary to the U-shaped profile of the other part 22. The connecting element 121 is preferably attached to the other part via the support structure. The connecting element 121 can be attached to the other part 22 by fastening means such as rivets, screws, bolts, pins and so on, or can be welded or glued to the other part 22. On top of the hollow profile, i.e., the side of the connecting element being opposite to the support structure, the rail 21b, namely the one part glued to the photovoltaic converter panel (not shown), is positioned and attached to by means of a screw.

FIG. 12c shows the section C of the corrugated sheet representing the other part 22 of the mounting arrangement. Said section comprises also a U-shaped profile where a connecting element 121 is riveted to. The connecting element 121 is comparable to the one shown in FIG. 12b. However, the way the one part 21a is attached to the connecting element 121 differs from the way shown in FIG. 12c. A screw is pushed through the hollow profile of the connecting element 121 forming an protrusion on two sides of the connecting element 121 such that the one part 21a comprising recesses at the edges can be hooked onto the connecting element by means of the protruding screw. The screw is fixed to the connecting element 121 by a nut.

FIG. 12d shows an embodiment of an other part 22 comparable to the other part of the mounting arrangement of FIG. 12a and provides information regarding the size of such an other part 22. The bottom width of a U-shaped profile is 29 mm, the top width is 15 mm and the height is 38 mm. The free distance between two U-shaped profiles is 154 mm and the distance from the middle of one profile to the middle of a neighboring profile is 183 mm.

FIG. 13a shows a perspective view of an embodiment of a mounting arrangement 20 that is designed in two parts. The one part designated to be glued to the photovoltaic converter panel (not shown) and the connecting element are the same part in the shown embodiment and are called the connecting element 121 for the description of FIGS. 12a and 12b. The connecting element 121 comprises a support structure being attached to the other part 22, here shown as corrugated sheet, and a hollow profile, where the photovoltaic converter panel (not shown) is designated to be glued to. The support structure protrudes the hollow profile of the connecting element 121 such that the connecting element 121 can be fixed to the corrugated sheet 22 via the protruding support structure, e.g., by a screw.

FIG. 13b shows a cross section of an embodiment of a photovoltaic element 1 comprising a photovoltaic converter panel 10, a connecting element 121, where the photovoltaic converter panel 10 is glues to and an other part 22, here shown as corrugated sheet, to be attached to a surface (not shown). Having a support structure of the connecting element 121 that protrudes the hollow profile of the connecting element 121 is not only providing for a convenient fixation of the connecting element 121 to the corrugated sheet 22 but also for having space for the junction box hosting electrical connectors and alike.

FIG. 14 shows an embodiment of a photovoltaic element 1 comprising of photovoltaic converter panel 10 and a mounting arrangement comprising mainly three parts, one part 21 being glued to the photovoltaic converter panel 10, another part 22 being attached to a surface 40 and a third part named connecting element 121 for connecting the one part 21 and the other part 22. In the shown embodiment the one part 21 is a rail with a U-shaped cross section and protrusions, e.g., hook-shaped protrusions pointing away from the side of the rail being glued to the photovoltaic converter panel 10. The shown photovoltaic converter panel 10 is approximately 1.045 m wide and 1.70 m long, thus providing for a net surface of 1.78 m$^2$. Opposite to the embodiment shown, e.g., in FIG. 8, it is not the connecting element 121 providing for the protrusion and the one part 21 providing for the hook element but the other way around. The shown connecting element 121 comprises slits (not visible) to receive the hook-shaped protrusions of the rails 21. The slits are part of the hollow profile of the connecting element 121. The connecting element 121 provides not only enough space to receive the protrusions of the one part 21 but also provides for a ventilation gap. The connecting element 121 is attached to the other part 22 by rivets.

FIG. 15 shows an embodiment of a photovoltaic element 1 comprising a photovoltaic converter panel 10 being glued to a mounting arrangement 20. Said mounting arrangement is designed in one part and implemented by essentially rectangular tubes made of, e.g., stainless steel. Such an embodiment is in particular suitable for small residential roofs.

The invention claimed is:

1. A step-proof photovoltaic element comprising a photovoltaic converter panel which defines a front surface adapted to receive solar impinging light and which defines a back surface opposing the front surface, and at least one mounting arrangement mounted to said back surface of the photovoltaic converter panel by a glue, wherein:

the mounting arrangement is glued to the back surface of the photovoltaic converter panel via gluing spots, wherein an area of a gluing spot is ≥2.0 cm$^2$ and ≤1500 cm$^2$;

a distance $i_x$ between adjacent gluing spots along an x-axis of the photovoltaic converter panel in [m] is ≤70 [N]*d/m; and a distance $i_y$ between adjacent gluing spots along a y-axis of the photovoltaic converter panel in [m] is ≤70 [N]*d/m;

d being a thickness of the photovoltaic converter panel in [mm] and m being weight of a handyman/installer/maintenance worker in [N], wherein the at least one mounting arrangement is designed in three parts, one part thereof being mounted to said back surface of the photovoltaic converter panel by said glue, another part thereof being attachable to a surface, and a third part being a connecting element for connecting the one part and the other part, and wherein the one part comprises rails having a U-shaped profile, the other part comprises at least one corrugated sheet having one or more U-shaped profiles, and one side of the connecting element being designed complementary to the U-shaped profiles of the one part and an opposite side of the connecting element being designed complementary to the U-shaped profile of the other part.

2. Photovoltaic element according to claim 1, wherein the at least one mounting arrangement is designed as a plate.

3. Photovoltaic element according to claim 1, wherein the at least one mounting arrangement comprises one part of a link designed to be engaged with a respectively tailored counterpart.

4. Photovoltaic element according to claim 1, wherein the at least one mounting arrangement comprises at least one pair of mechanical linking members that are mutually hingeable or interlockable and provide for a controllable release of said one part and said other part of the mounting arrangement.

5. Photovoltaic element according to claim 4, wherein the at least one pair of mechanical linking members defines a unique direction of said controllable release, in particular said unique direction being parallel to the photovoltaic converter panel.

6. Photovoltaic element according to claim 1, wherein the at least one mounting arrangement comprises at least one pair of mechanical linking members that are mutually hingeable or interlockable and prevent a release of said one part and said other part of the mounting arrangement.

7. Photovoltaic element according to claim 4, wherein the at least one pair of mechanical linking members is realized by hooks at one part and by respective openings at the other part.

8. Photovoltaic element according to claim 1, wherein the at least one mounting arrangement is at least in part a distance holder which provides at least one venting gap at the back surface of the photovoltaic converter panel.

9. Photovoltaic element according to claim 1, wherein the connecting element is a hollow profile with a support structure.

10. Photovoltaic element according to claim 9, wherein the hollow profile is connected to the one part and the support structure is connected to the other part.

11. Photovoltaic element according to claim 1, wherein the one part is a hollow profile with a support structure.

12. Photovoltaic element according to claim 11, wherein the hollow profile is mounted to said back surface of the photovoltaic converter panel by said glue and the support structure is connected to the other part.

13. Photovoltaic element according to claim 1, wherein the area of a gluing spot is $\geq 20$ cm$^2$ and $\leq 600$ cm$^2$.

14. Photovoltaic element according to claim 1, wherein the distance $i_x$ between adjacent gluing spots along the x-axis of the photovoltaic converter panel in [m] and the distance $i_y$ between adjacent gluing spots along the y-axis of the photovoltaic converter panel in [m] is each $\geq 0.10$ m and $\leq 0.85$ m.

15. Photovoltaic element according to claim 14, wherein the photovoltaic converter panel is essentially rectangular.

16. Photovoltaic element according to claim 1, wherein the at least one corrugated sheet has more than one U-shaped profile, a free distance between two U-shaped profiles being 154 mm.

17. Photovoltaic element according to claim 1, wherein the other part is a corrugated sheet having several U-shaped profiles and the one part is designed as a U-shaped rail, and wherein more than one of said U-shaped rails are glued to a photovoltaic converter panel.

18. Photovoltaic element according to claim 17, wherein the connecting element provides for a ventilation gap.

19. Photovoltaic element according to claim 17, wherein the photovoltaic converter panel provides for a net surface of 1.78 m$^2$.

20. Mounted surface with at least two photovoltaic elements according to claim 1, wherein the adjacent mounting arrangements are sealingly connected to provide for a single waterproof layer.

21. Mounted surface with at least three photovoltaic elements according to claim 1 arranged in line, wherein a center photovoltaic element is blocked by the adjacent photovoltaic elements.

22. Mounted surface with at least two photovoltaic elements according to claim 5, wherein one of the photovoltaic elements is blocked in said unique direction by the adjacent photovoltaic element.

* * * * *